US009824332B1

(12) United States Patent
Everton et al.

(10) Patent No.: US 9,824,332 B1
(45) Date of Patent: Nov. 21, 2017

(54) EMAIL DATA COLLECTION COMPLIANCE ENFORCEMENT

(71) Applicant: eTorch Inc., Chicago, IL (US)

(72) Inventors: Paul R Everton, Chicago, IL (US); Chad M Gilles, Chicago, IL (US); Tian Wang, Chicago, IL (US)

( * ) Notice: Subject to any disclaimer, the term of this patent is extended or adjusted under 35 U.S.C. 154(b) by 0 days.

(21) Appl. No.: 15/670,169

(22) Filed: Aug. 7, 2017

Related U.S. Application Data

(60) Provisional application No. 62/484,444, filed on Apr. 12, 2017.

(51) Int. Cl.
*H04L 29/06* (2006.01)
*G06Q 10/10* (2012.01)
*G06F 17/30* (2006.01)

(52) U.S. Cl.
CPC ..... *G06Q 10/107* (2013.01); *G06F 17/30887* (2013.01); *H04L 29/06585* (2013.01); *H04L 29/06591* (2013.01); *H04L 63/0428* (2013.01)

(58) Field of Classification Search
CPC ......... H04L 29/06585; H04L 29/06591; G06F 17/30887
See application file for complete search history.

(56) References Cited

U.S. PATENT DOCUMENTS 8,312,543 B1 * 11/2012 Gardner .............. H04L 63/1416 726/22
8,578,036 B1 * 11/2013 Holfelder .......... G06F 17/30864 709/204
8,712,848 B2 * 4/2014 Jacobs ................. G06Q 10/107 705/14.4
8,826,432 B2 * 9/2014 Dabbiere ............ H04L 63/0281 726/22
8,832,206 B2 * 9/2014 Bhagat ................ H04L 12/5885 709/206
2002/0152272 A1 * 10/2002 Yairi ................ G06F 17/30168 709/204
2005/0201536 A1 * 9/2005 LaLonde ................ H04L 51/12 379/93.24
2009/0254971 A1 * 10/2009 Herz ...................... G06Q 10/10 726/1
2010/0299719 A1 * 11/2010 Burks ................. G06F 9/44505 726/3
2012/0016865 A1 * 1/2012 Travieso ............ G06F 17/2827 707/711
2014/0122520 A1 * 5/2014 Jung .................. G06Q 30/0623 707/769
2015/0058429 A1 * 2/2015 Liu ......................... H04L 51/34 709/206
2017/0185656 A1 * 6/2017 Nelson .............. G06F 17/30554

* cited by examiner

*Primary Examiner* — Ali Shayanfar

(57) ABSTRACT

A system comprises connection handler circuitry and privacy enforcement circuitry of a first email subsystem. The connection handler circuitry is operable to receive the email message from a mail user agent. The privacy enforcement circuitry is operable to, after the reception of the email message by the connection handler circuitry and before relaying of the email message to a second email subsystem: detect tracking code in the email message; and replace the detected tracking code with replacement content. The connection handler circuitry is operable to send the email message to the second email subsystem after the replacement of the detected tracking code in the email message. The tracking code may comprise a first uniform resource locator (URL), and the replacement content may comprise a second URL.

42 Claims, 15 Drawing Sheets

128 Web Client
Email Client 120
Other domain(s) email systems 130
Public 124
122 Firewall
144 Remote email subsystem
120 Email Client
Database 150
102 On-premises email subsystem
LAN 150

102/144
email system (x.com)
Analytics and Reporting 117
Connection handler 110
Content handling 115
Privacy Enforcement 112
Message storage handler 114
Background message processing 113
SW 118
Networking 106
Storage 108
Processing 104
HW 116

URL/to/dashboard

A@X.COM SECURED EMAILS REPORT FOR PERIOD 2016/1/1 to 2016/1/7

| Date rcvd | Sender | Subject | Add to Whitelist? | Tracking code type |
|---|---|---|---|---|
| Jan 1, 2016 | F@Z.com | xxxxxx | ☐ | Targeted |
| Jan 3, 2016 | L@Q.com | xxxxxx | ☐ | Behavioral |
| Jan 7, 2016 | I@Y.com | xxxxxx | ☒ | Bulk |

| Email Address | Opted in date | Privacy policy accepted | IP address | Open history |
|---|---|---|---|---|
| F@Z.com | 1/1/2016 | v1 | unconsented | unconsented |
| L@Q.com | 1/1/2017 | v2 | 0.1.2.3 | 20170201campaign, 20170208campaign |
| I@Y.com | 3/3/2017 | v2 | 1.2.3.4 | 20170208campaign |

EMAIL DATA COLLECTION COMPLIANCE ENFORCEMENT

PRIORITY CLAIM

This application claims priority to U.S. provisional patent application No. 62/484,444, which is hereby incorporated herein by reference.

BACKGROUND

Limitations and disadvantages of conventional approaches to email will become apparent to one of skill in the art, through comparison of such approaches with some aspects of the present method and system set forth in the remainder of this disclosure with reference to the drawings.

BRIEF SUMMARY

Methods and systems are provided for email data collection compliance enforcement, substantially as illustrated by and/or described in connection with at least one of the figures, as set forth more completely in the claims.

BRIEF DESCRIPTION OF THE DRAWINGS

FIG. 9 illustrates an example dashboard of the email system of FIG. 1.

DETAILED DESCRIPTION

Figure 1A:
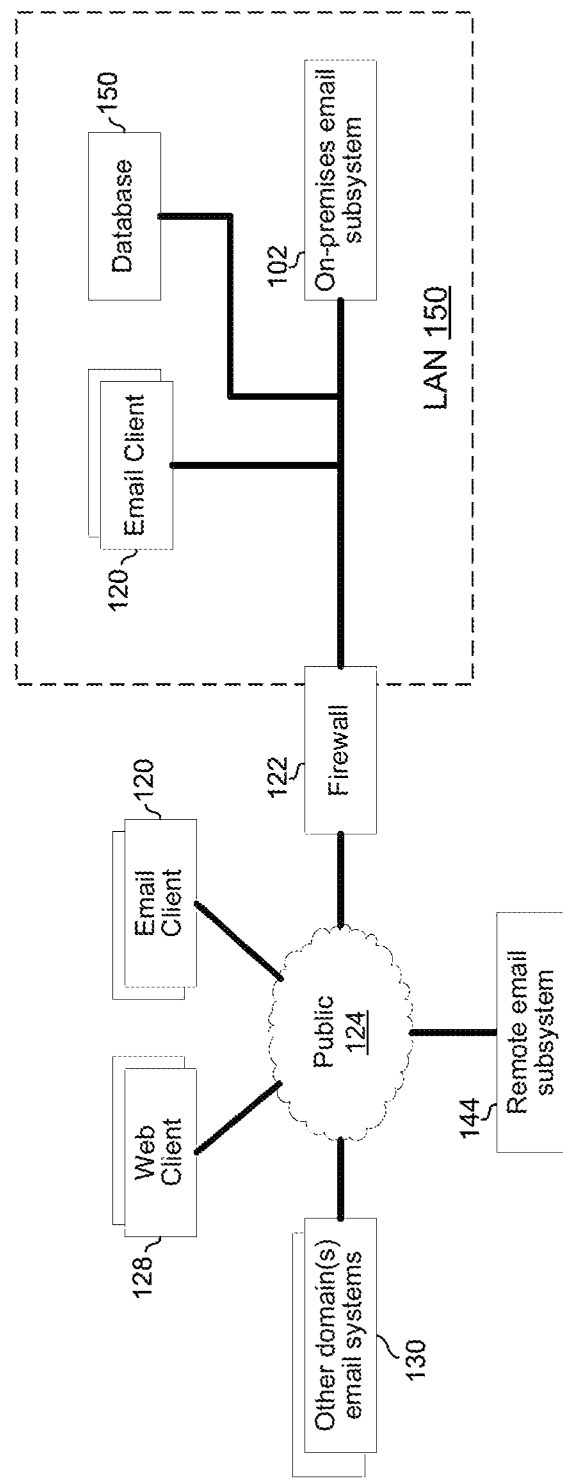
FIGS. 1A and 1B illustrate an example network comprising a system configured to prevent non-compliant collection of data via tracking objects embedded in emails.

FIG. 1A illustrates an example network comprising a system configured to prevent non-compliant collection of data via tracking objects embedded in emails. Shown are an on-premises email subsystem 102 (which operates as the email server(s) for domain x.com), a plurality of email clients 120, a firewall 122, a plurality of web clients 128, a plurality of mail systems 130 (which operate as the email servers for domains other than X.com), a remote email subsystem 144, and a database 150. The firewall 122, some of the email clients 120, the web clients 128, other domain email systems 130, and remote email subsystem 144 are interconnected via a public network 124 (e.g., the Internet).

The firewall 122 comprises circuitry operable to monitor and control traffic coming into and out of the local area network (LAN) 150.

Each email client 120 is, for example, a desktop, laptop, tablet, or phone configured to run email client software such as Microsoft Outlook, Mozilla Thunderbird, or the like. Some of the email clients 120 are connected to the email subsystem 102 via connections contained within LAN 150, and others are connected via public network 124 and firewall 122. The email clients 120 may connect to the email subsystem 102 using a protocol such as SMTP, MAPI, IMAP, EAS, EWS, and/or POP3.

Each web client 128 is, for example, a desktop, laptop, tablet, or phone configured to run a web browser such as Google Chrome, Mozilla Firefox, or the like. A user of a web mail client 128 may access the email subsystem 102 by browsing to a webmail interface (e.g., https://www.owa.x-.com) in the web browser.

The email systems 130 handle email for domains other than x.com (e.g., y.com). Each of the mail systems 130 may be substantially the same as the mail system comprising subsystem(s) 102 and/or 144 ("email system 102/104") or may comprise one or more conventional email servers.

The database 150 may store information about senders and/or recipients of emails sent and/or received by email system 102/144. Some of the information in the database 150 may be subject to data privacy regulations (e.g., it may be Personally Identifiable Information (PII) as defined in the European Union's General Data Protection Regulation (GDPR)). For any particular email address, domain, IP address, and/or other information associated with an email recipient, the database 150 may store a record of what consent has been received from that recipient (e.g., whether the recipient has accepted the privacy policy on x.com's website, whether the recipient has accepted the privacy policy of one or more third-party email sales/marketing solution providers, whether the recipient has opted in to receive marketing emails, whether the recipient has opted in to permit tracking of his/her interactions with emails from x.com or from one or more third-party email sales/marketing solution providers, whether the recipient has submitted a "do not track" request, and/or the like). An example table of the database 150 is described below with reference to FIG. 10. For any particular email address, domain, IP address, and/or other information associated with an email sender, the database 150 may store: an indication of what role the email sender has within an organization whose email is handled by the email system 102/144 (e.g., "operations," "engineering," "sales & marketing," or the like); and/or an indication of permissions granted to the email sender (e.g., domains to which the sender is permitted—or not permitted—to send email messages; format and/or content of emails that the sender is permitted to send (e.g., can only send plain text, cannot send emails that reference remotely hosted content, cannot send emails with attachments, and/or the like).

Various aspects of this disclosure are directed to an email system operable to process incoming and/or outgoing email messages in accordance with a data privacy policy (and/or other email policies) put in place by an administrator of the email system. In various example implementations, the email system 102/144 is implemented entirely in an on-premises email subsystem 102, entirely in a remote email subsystem 144, or is distributed among the on-premises subsystem 102 and the remote email subsystem 144. An example implementation of the email system 102/144 comprising one or both of email subsystem 102 and email subsystem 144 is described below with reference to FIG. 1B, to which attention is now directed.

The email system 102/144 comprises hardware 116 that in turn comprises processing circuitry 104 (e.g., one or more chipsets or systems-on-chip comprising one or more CPUs, memory, one or more graphics processors, one or more I/O controllers, etc.), network interface circuitry 106 (e.g., Ethernet, Wi-Fi, LTE, and/or the like) and storage circuitry 108 (e.g., one or more hard disk drives, solid state drives, and/or the like, and associated control/drive circuitry). The hardware 116 is configured by software and/or firmware 118 to realize special purpose circuitry for handling email as described in this disclosure. In an example implementation, the special purpose circuitry comprises connection handler circuitry 110, privacy enforcement circuitry 112, background message processing circuitry 113, message storage handling circuitry 114, content handling circuitry 115, and analytics and reporting circuitry 117.

The connection handler circuitry 110 is operable to connect the email system 102/144 to email clients 120, web clients 128, and other email systems 130 using HTTP/HTTPS, SMTP, MAPI, IMAP, EAS, EWS, POP3, and/or any other suitable protocol(s).

Figure 2:
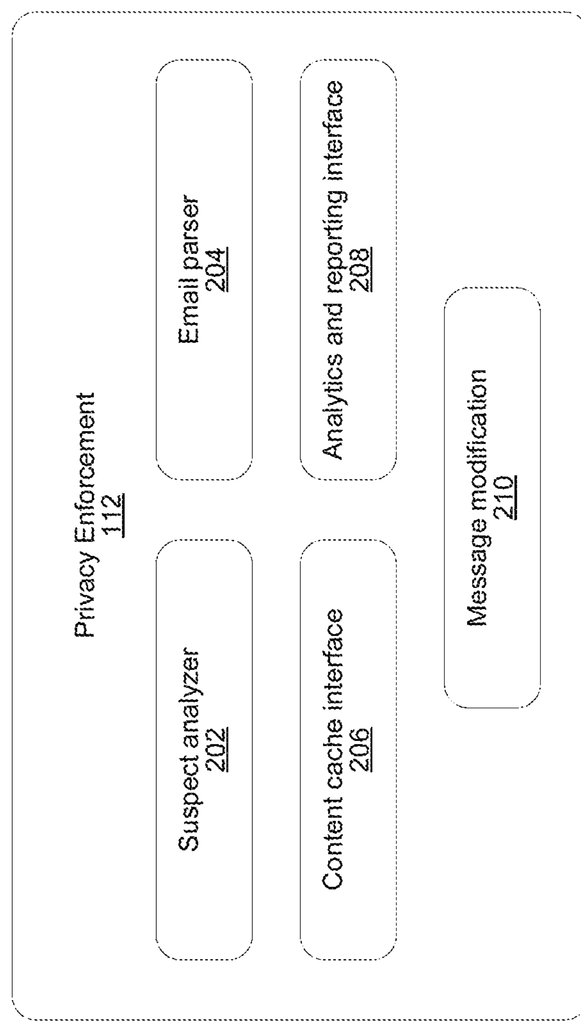
FIG. 2 depicts an example implementation of the privacy enforcement circuitry of FIG. 1B.

The privacy enforcement circuitry 112 is operable to analyze the content of email messages coming into and/or going out of email system 102/144. The privacy enforcement circuitry 112 is operable to handle the email messages (e.g., send, redirect, drop, archive, etc.) based on the results of the analysis. Such handling may include, for example, modifying the content of the email messages (e.g., add text and/or HTML elements, remove text and/or HTML elements, change text formatting, and/or the like) as desired or necessary based on a data privacy policy that is in place. In an example implementation, the data privacy policy is a "no-tracking" policy applicable to emails meeting determined criteria (e.g., email messages to and/or from particular users, email messages having particular content in their headers, body, and/or attachments, emails for which appropriate consent/permissions to track are not found in database 150, and/or the like), and the privacy enforcement circuitry 112 is operable to perform the process(es) of FIGS. 3B and 3C for each received email to which the "no-tracking" policy is applicable, and the process(es) of FIG. 4B for each outbound email to which the "no-tracking" policy is applicable. An example implementation of the privacy enforcement circuitry is shown in FIG. 2. In an example implementation, the data privacy policy is an "opt-in required" policy which prevents emails from being sent to recipients who have not opted-in to receive such emails (e.g., as indicated by a "newsletter opt-in" field in the database 150).

The background message processing circuitry 113 is operable to scan an email message and/or external content associated with email message in parallel with the email message being processed by privacy enforcement circuitry 112 and message storage handling circuitry 114. In this manner, background message processing circuitry 113 may continue to analyze a copy of an email message and/or external content associated with the email message after the email message has been placed in its recipient(s) inbox(es) (for inbound mail) and/or after the email message has been sent into network 124 (for an outbound mail). An example operation of the background message processing circuitry 113 is described below with reference to FIGS. 10 and 11.

The message storage handling circuitry 114 is operable to store email messages and metadata pertaining to the email messages to storage circuitry 108. The message storage handling circuitry 114 is operable to retrieve email messages and metadata pertaining to the email messages from storage circuitry 108.

The content handling circuitry 115 is operable to store and serve (cache) content embedded in, linked to by, and/or attached to email messages sent and/or received by the email system 102/144. The content handling circuitry 115 may cache the content at a location identified by a unique uniform resource locator (URL) accessible via one or more networking protocols (e.g., FTP, HTTP/HTTPS, RDMA, etc.). The content handling circuitry 115 may cache the content at a location identified by a unique file path and file name, and may be accessible via one or more local memory access protocols (e.g., POSIX commands of a local operating system). In an example implementation, the content handling circuitry 115 retrieves content from a first URL (e.g., a URL extracted from an incoming and/or outgoing email message by the privacy enforcement circuitry 112), stores the content in storage circuitry 108, and makes the stored content accessible via a second URL (e.g., a URL generated by the privacy enforcement circuitry 112). In an example implementation, the content handling circuitry 115 retrieves an image from a first URL (e.g., a URL extracted from an incoming and/or outgoing email message by the privacy enforcement circuitry 112), attaches the image file to the email message, and replaces, in the email message, the extracted http or https URL with a content-ID (CID) URL that targets the attached image, and then transmits the email with image file attachment.

The analytics and reporting circuitry 117 is operable collect, analyze, and generate data and/or metadata extracted from, and/or generated based on, email messages received and/or sent by the email system 102/144.

Figure 1B:
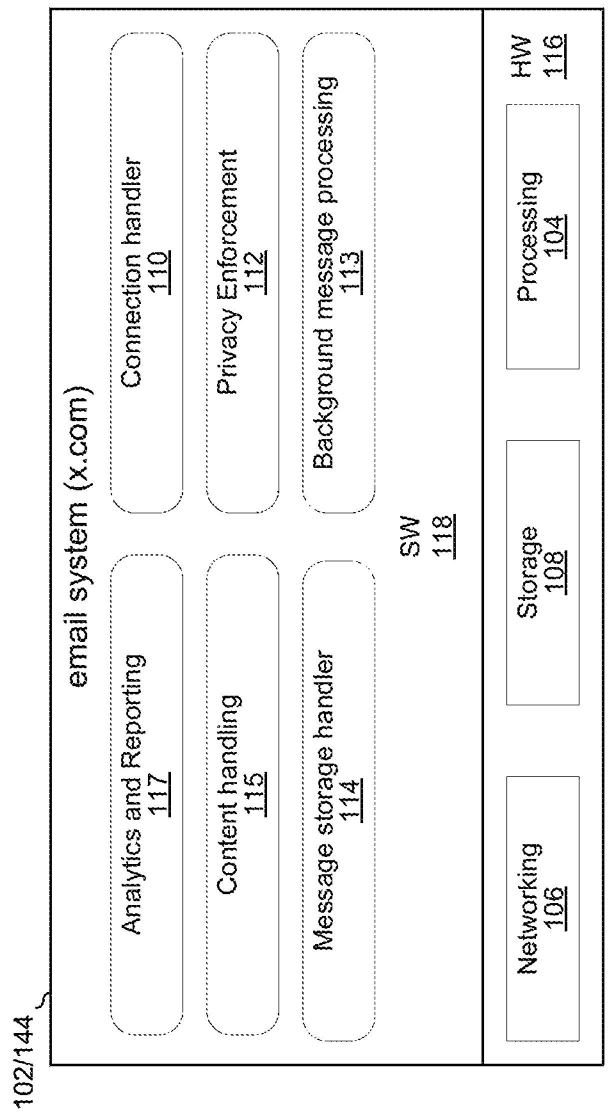

FIG. 2 depicts an example implementation of the privacy enforcement circuitry of FIG. 1B. The example implementation comprises tracking suspect analyzer circuitry 202, email message parsing circuitry 204, content cache interface circuitry 206, analytics and reporting interface circuitry 208, and message modification circuitry 210.

The email message parsing circuitry 204 is operable to scan email message contents (SMTP envelope, message headers, message body, and attachments) for tracking code suspects (e.g., raw binary and/or encoded content containing predefined strings and/or matching predefined regular expressions), and, upon finding a tracking code suspect, pass the tracking code suspects to the tracking suspect analyzer circuitry 202.

The tracking suspect analyzer circuitry 202 is operable to apply a tracking code identification algorithm to the tracking code suspects received from the email message parsing circuitry 204 to determine, for each suspect, whether it is in-fact a tracking code. The tracking suspect analyzer circuitry 202 may also be operable to characterize identified tracking code. Such characteristics may include, for example: a vendor or organization associated with particular tracking code; amount and/or type of information revealed by the tracking code; risk level associated with the tracking code, and/or the like.

In an example implementation, tracking code suspects may include <img> HTML elements, and the tracking suspect analyzer circuitry 202 determines whether a suspect is in-fact tracking code based on characteristics of the <img> element. Such characteristics may include, for example, one or more of: the size of the <img> element (e.g., <img> elements with size below some threshold number of pixels may be more likely to be identified as tracking code);

transparency of the <img> element (e.g., <img> elements having a transparency attribute that is above a determined threshold may be more likely to be identified as tracking code); color(s) of the <img> element (e.g., <img> elements that are the same as or similar to a background color may be more likely to be flagged as tracking code); randomness of a URL of the <img> element (e.g., <img> elements having URLs with long strings of hexadecimal characters not having dictionary entries may be more likely to be identified as tracking code); length of a URL of the <img> element (e.g., <img> elements having very long URLs may be more likely to be identified as tracking code); presence of particular word(s) or regular expressions in a URL of the <img> element; any aliases or IP address(es) associated with a URL of the <img> element in a DNS records (e.g., the tracking suspect analyzer circuitry 202 may be operable to perform DNS lookups); a URL to which a URL of the <img> element redirects (e.g., the tracking suspect analyzer circuitry 202 may be operable run a sandboxed web browser via which it attempts to visit the URL and follows any redirects); location of the <img> element within the message body (e.g., <img> elements after the signature of an email message may be more likely to be identified as tracking code); whether and how many times an identical or similar <img> element has been detected (e.g., the same <img> element appearing many times within the same email message or a particular group of email messages may be more likely to be identified as tracking code); and/or based on an image file associated with (e.g., via URL or file path) the <img> element (e.g., previous images having the same file signature were associated with identified tracking code, previous images with the same binary content were associated with identified tracking code, and/or the visible content of the image file as determined by a "machine vision" or pattern recognition algorithm performed on the image by the tracking suspect analyzer circuitry 202).

In an example implementation, tracking code suspects may include <a> HTML elements, and the tracking suspect analyzer circuitry 202 may determine whether a suspect is in-fact tracking code based on characteristics of the <a> element. Such characteristics may, for example, include one or more of: randomness of a URL of the <a> element (e.g., <a> elements having URLs with long strings of hexadecimal characters not having dictionary entries may be more likely to be identified as tracking code); length of a URL of the <a> element (e.g., <a> elements having very long URLs may be more likely to be identified as tracking code); presence of particular word(s) or regular expressions in a URL of the <a> element; any aliases or IP address(es) associated with a URL of the <a> element in a DNS records; and/or a URL to which a URL of the <a> element redirects (e.g., the tracking suspect analyzer circuitry 202 may be operable run a sandboxed web browser via which it attempts to visit the URL).

In an example implementation, tracking code suspects may include any <script> HTML elements, and the tracking suspect analyzer circuitry 202 may determine whether a suspect is in-fact tracking code based on characteristics of the <script> element. Such characteristics may include one or more of: randomness of a URL of the <script> element (e.g., <script> elements having URLs with long strings of hexadecimal characters may be more likely to be identified as tracking code); length of a URL of the <script> element (e.g., <script> elements having very long URLs may be more likely to be identified as tracking code); presence of particular word(s) or regular expressions in a URL of the <script> element; any aliases or IP address(es) associated with a URL of the <script> element in a DNS records; and/or a URL to which a URL of the <script> element redirects (e.g., the tracking suspect analyzer circuitry 202 may be operable run a sandboxed web browser via which it attempts to visit the URL).

In an example implementation, tracking code suspects may include <link> HTML elements, and the tracking suspect analyzer circuitry 202 may determine whether a suspect is in-fact tracking code based on characteristics of the <link> element. Such characteristics may include one or more of: randomness of a URL of the <link> element (e.g., <link> elements having URLs with long strings of hexadecimal characters may be more likely to be identified as tracking code); length of a URL of the <link> element (e.g., <link> elements having very long URLs may be more likely to be identified as tracking code); presence of particular word(s) or regular expressions in a URL of the <link> element; any aliases or IP address(es) associated with a URL of the <link> element in a DNS records; and/or a URL to which a URL of the <link> element redirects (e.g., the tracking suspect analyzer circuitry 202 may be operable run a sandboxed web browser via which it attempts to visit the URL).

In an example implementation, tracking code suspects may include <input> HTML elements, and the tracking suspect analyzer circuitry 202 may determine whether a suspect is in-fact tracking code based on characteristics of the <input> element. Such characteristics may include one or more of: randomness of a URL of the <input> element (e.g., <input> elements having URLs with long strings of hexadecimal characters may be more likely to be identified as tracking code); length of a URL of the <input > element (e.g., <input > elements having very long URLs may be more likely to be identified as tracking code); presence of particular word(s) or regular expressions in a URL of the <input> element; any aliases or IP address(es) associated with a URL of the <input> element in a DNS records; and/or a URL to which a URL of the <input> element redirects (e.g., the tracking suspect analyzer circuitry 202 may be operable run a sandboxed web browser via which it attempts to visit the URL).

The content cache interface circuitry 206 is operable to: (1) receive, from the tracking suspect analyzer circuitry 202, a first URL pointing to a location at which content (e.g., images, videos, etc.) is stored, and a second URL via which the content is to be accessible when cached in the email system 102/144; and (2) provide the first URL, and the second URL to the content handling circuitry 115 for caching of the content.

The analytics and reporting interface circuitry 208 is operable to convey data and metadata from the email message parsing circuitry 204 and/or the suspect analyzer circuitry 202 to the analytics and reporting circuitry 117. Such data and/or metadata may include, for example: number of email messages processed by email message parsing circuitry 204; number of suspects found by email message parsing circuitry 204; number of tracking code suspects identified as tracking code by tracking suspect analyzer circuitry 202; categorizations/characteristics of tracking code identified by tracking suspect analyzer circuitry 202, senders and/or recipients of the messages containing identified tracking code; and/or the like.

The message modification circuitry 210 is operable to modify headers, message bodies, and/or attachments of email messages processed by the privacy enforcement circuitry 112. The modification of an email message header may comprise, for example, adding a header, removing a header, modifying a header. The modification of an email message body may comprise, for example, adding text, adding an HTML element (e.g., an <img> HTML element having a URL that points to a location in the email system 102/144), modifying text, modifying an HTML element, removing text, and/or removing an HTML element. The modification of an email message attachment may comprise, for example, adding text, adding an HTML element, modifying text, modifying an HTML element, removing text, and/or removing an HTML element. The message modification circuitry 210 is operable to add and/or remove attachments to email messages.

Figure 3A:
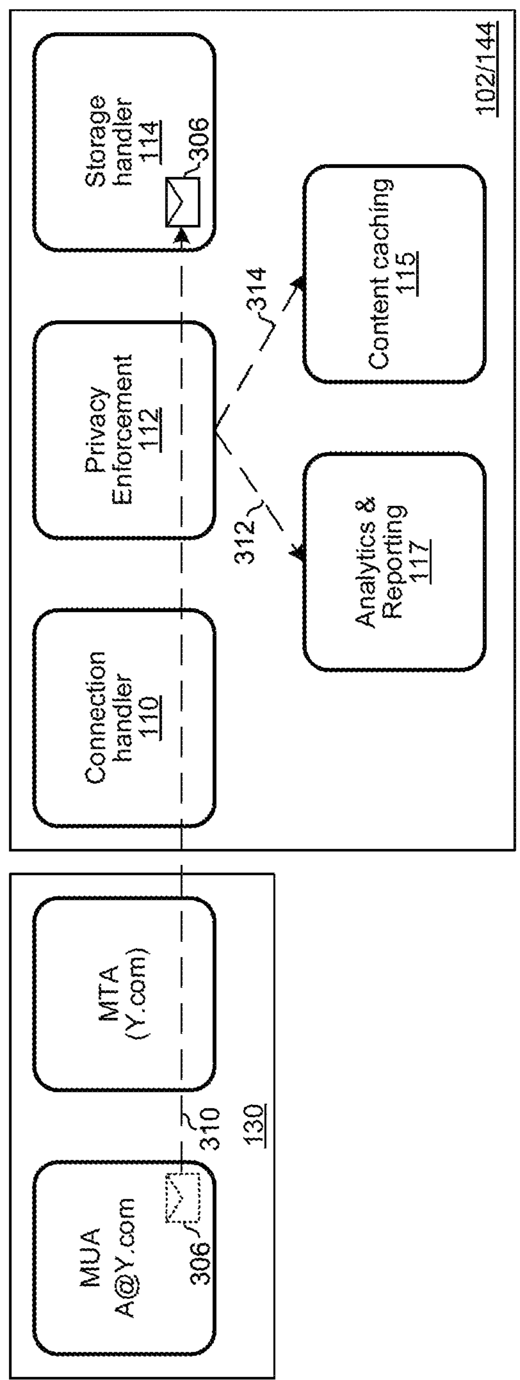
FIG. 3A illustrates a first example flow of an email message through the system of FIG. 1 during reception of the email message by the email system of FIG. 1.

FIG. 3A illustrates a first example flow of an email message through the system of FIG. 1 during reception of the email message by the email system of FIG. 1. Arrow 360 represents propagation of an email message 306 that is (1) generated in a mail user agent (MUA) of email system 130; (2) communicated to email system 130 (e.g., via SMTP); (3) communicated to email system 102/144 (e.g., via a SMTP connection to connection handler circuitry 110); (4) processed via privacy enforcement circuitry 112 before it is available in its recipient(s)' mailbox(es); and (5) stored by message storage handling circuitry 114 at which point the email message 306 is available to (and, in some instances, may be pushed to) its recipient(s)' mailbox(es). Arrow 312 illustrates data and/or metadata being passed to analytics and reporting circuitry 117. Arrow 314 illustrates data and/or metadata being passed to content handling circuitry 115.

Figure 3B:
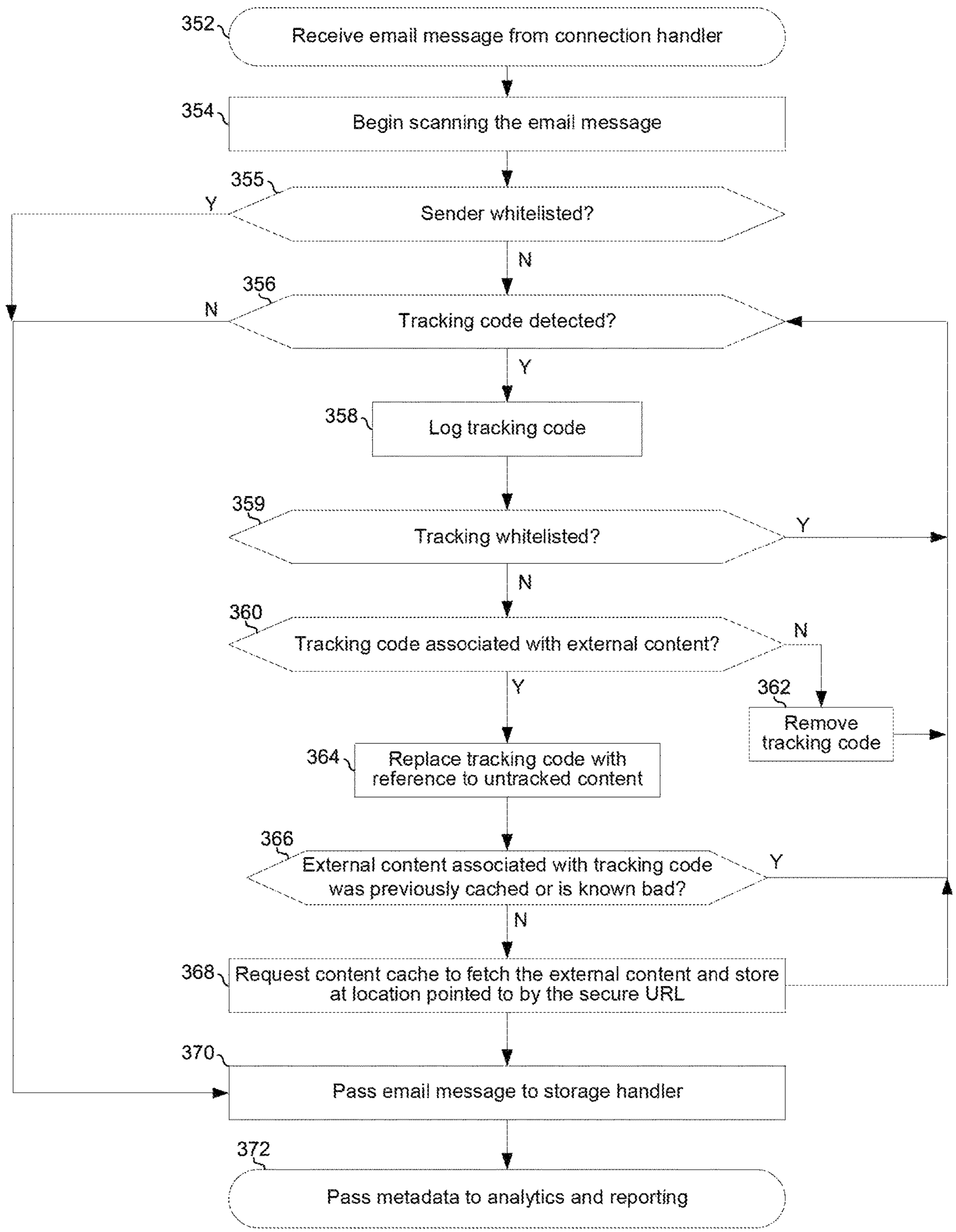
FIG. 3B is a flowchart illustrating an example process performed by the privacy enforcement circuitry of FIG. 1.

FIG. 3B is a flowchart illustrating an example process performed by the privacy enforcement circuitry of FIG. 1. The process is described with reference to elements shown in FIGS. 2 and 3A. The process begins with block 352 which takes place after the email message 306 has been received by connection handler circuitry 110 via SMTP and has been passed to privacy enforcement circuitry 112, but before the email message 306 is made available to its x.com recipient(s) (e.g., may take place on the frontend transport or hub transport server before the email is conveyed to any mailbox servers).

In block 354, the privacy enforcement circuitry 112 begins scanning the email message 306.

In block 355, the privacy enforcement circuitry 112 determines whether the sender of the email has previously been whitelisted (e.g., via the interface described below with reference to FIG. 9). If the sender has been whitelisted, the process advances to 370. If the sender has not been whitelisted, the process advances to block 356.

In block 356, each time tracking code is detected during the scan of the email message then the process advances to block 358.

In block 358, the identified tracking code is logged. This may comprise, for example, passing the tracking code and/or characteristics of the tracking code to analytics and reporting circuitry 117 where it is added to a database. In an example implementation, the privacy enforcement circuitry 112 may flag the email message 306 as having been tracked by the sender (e.g., add the text "tracked" to the subject line and/or message body).

In block 359, the privacy enforcement circuitry 112 determines whether the tracking code has previously been whitelisted (e.g., whitelisted via the interface described below with reference to FIG. 9). If the tracking code has been whitelisted, the process returns to block 356. If the tracking code has not been whitelisted, then the process advances to block 360.

In block 360, if the tracking code identified in block 356 is not associated with external content, then the process advances to block 362 in which the tracking code is removed from the email. After block 360, the process returns to block 356 and the scanning continues looking for more tracking code in the email message.

Returning to block 360, if the tracking code identified in block 356 is associated with external content (e.g., a tracked <img>, <a>, <scripts>, <input>, or <link> element having a URL pointing to external/remotely-hosted content), then the process advances to block 364.

In block 364, the message modification circuitry 210 replaces the tracking code detected in block 356 with replacement content (e.g., replacement text, replacement HTML element, replacement URL, and/or the like). For example, the tracking code may comprise an <img> element with a first URL, and the message modification circuitry 210 may replace the first URL with a second URL. The second URL may point to a copy of the external content which has been cached by content handling circuitry 115.

Figure 5:
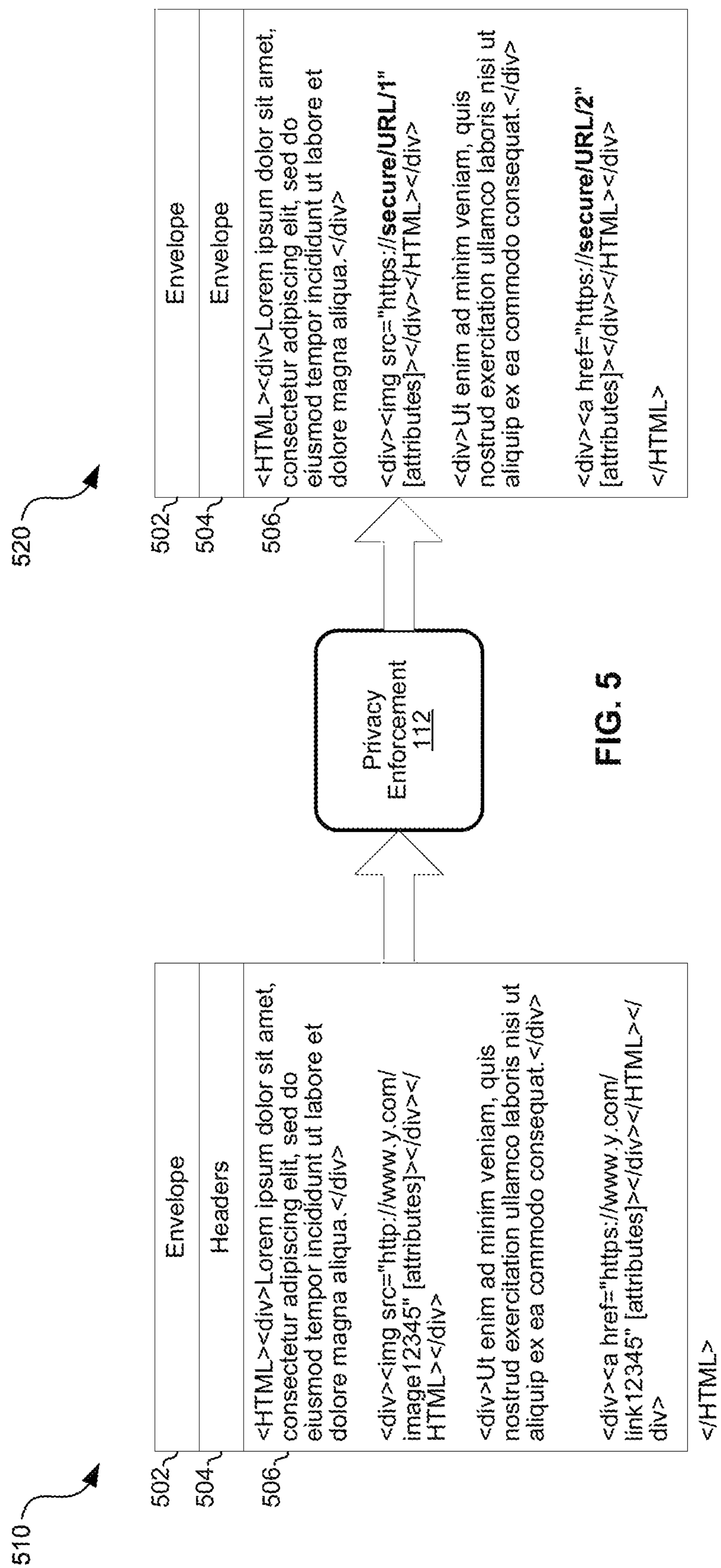
FIG. 5 illustrates an example processing of an email by the privacy enforcement circuitry of FIG. 1.

For example, referring briefly to FIG. 5, called out as 510 is email message 306 upon arriving at the privacy enforcement circuitry 112. Called out as 520 is the email message 306 after processing by the privacy enforcement circuitry 112. The email message 306 comprises SMTP envelope 502, message headers 504, and message body 506. The message body 506 comprises an <img> element having an original URL of "URL/to/image" and an <a> element having an original URL of "URL/to/anchor." After processing by the privacy enforcement circuitry 112, the original URL of the <img> element has been replaced with replacement URL "secure/URL/1." The replacement URL may point to a cached copy of the image which targeted by the original URL. Similarly, after processing by the privacy enforcement circuitry 112, the original URL of the <a> element has been replaced with replacement URL "secure/URL/2." The replacement URL may point to the ultimate destination (after any redirects, etc.) targeted by the original URL.

In an example implementation, a replacement URL inserted by message modification circuitry 210 may comprise the original URL appended to or concatenated with a URL that points to (i.e., targets) a location under common control with the email system 102/144. The original URL may be appended as a query string, as one or more path element (path elements are separated by forward slashes), or as a combination of a path element(s) and query string. To illustrate, assume an original URL of http://www.y.com/image12345, then a corresponding replacement URL may be, for example: https://www.x.com/y/com/image12345 or https://www.x.com?y.com/image12345. In an example implementation, the replacement URL may comprise an API key assigned to x.com (the domain associated with email system 102/144). For example, assuming an API key of "1811WN" the replacement URL may be https://www.x.com/y/com/image12345/1811WN or https://www.x.com?y.com/image12345/1811WN. In an example implementation, a portion of the replacement URL may be hashed or encoded using a key uniquely associated with x.com (the domain associated with email system 102/144). For example, first the original URL and an API key may be appended to a URL controlled by the owners of x.com (e.g., https://www.x.com/y/com/image12345/1811WN or https://www.x.com?y.com/image12345/1811WN), and then a portion of the URL may be hashed or encrypted (e.g., http://www.x.com/y/com/image12345/1811WN becomes https://www.x.com/4eYTRDhhy437% ˆ3, or http://www.x.com?y.com/image12345/1811WN becomes https://www.x.com?7DgeEF3$#$% d8y).

In an example implementation, a replacement URL inserted by message modification circuitry 210 is a content- ID URL that targets an image file attached to the email. For example, the <img> tag of the email may change from <img src=http://www.y.com/image12345/> to <img src=cid:image12345/>.

Returning to FIG. 3B, in block 366, it is determined whether content associated with the tracking code is already cached in the content handling circuitry 115 or is known to be unwanted or unneeded. Whether content is unwanted or unneeded may be determined based on one or more factors such as, for example: its transparency, its size (in pixels or bytes), its ALT text, whether the file name is on a black list, whether the URL at which the content is hosted (or any portion of the URL, such as domain) is on a black list, aliases or IP addresses associated with the URL at which the content is hosted, and/or the like. If the content is unwanted or unneeded, the process returns to block 356 and the scanning continues looking for more tracking code in the email message. If the content is not already cached and is not known to be unwanted or unneeded, then the process advances to block 368.

In block 368, the privacy enforcement circuitry 112 issues a request to the content handling circuitry 115 for the content handling circuitry 115 to download the external content and cache it. The privacy enforcement circuitry 112 may provide a first URL from which to retrieve the external content, and a second URL at which the cached content is to be accessible. After block 368, the process returns to block 356 and the scanning continues looking for more tracking code in the email message. In an example implementation in which the content handling circuitry 115 is in remote email subsystem 144 and the privacy enforcement circuitry 112 is in local email subsystem 102, the content cache interface circuitry 206 may queue up a plurality of URLs corresponding to content to be cached. The plurality of queued URLs may then be sent to the content handling circuitry 115 in a single request.

Returning to block 356, if no more tracking code is detected in the email message, then the process advances to block 370.

In block 370, the message, after having all tracking code removed or replaced, is passed to message storage handling circuitry 114, at which point it becomes available in its x.com recipient(s)' mailbox(es).

In block 372, data and/or metadata is passed to the analytics and reporting circuitry 117. Such data may include, for example, headers of the email message 306 and content and/or characteristics of tracking code detected in the email message 306 (e.g., URLs and/or HTML elements of the tracking code).

Figure 3C:
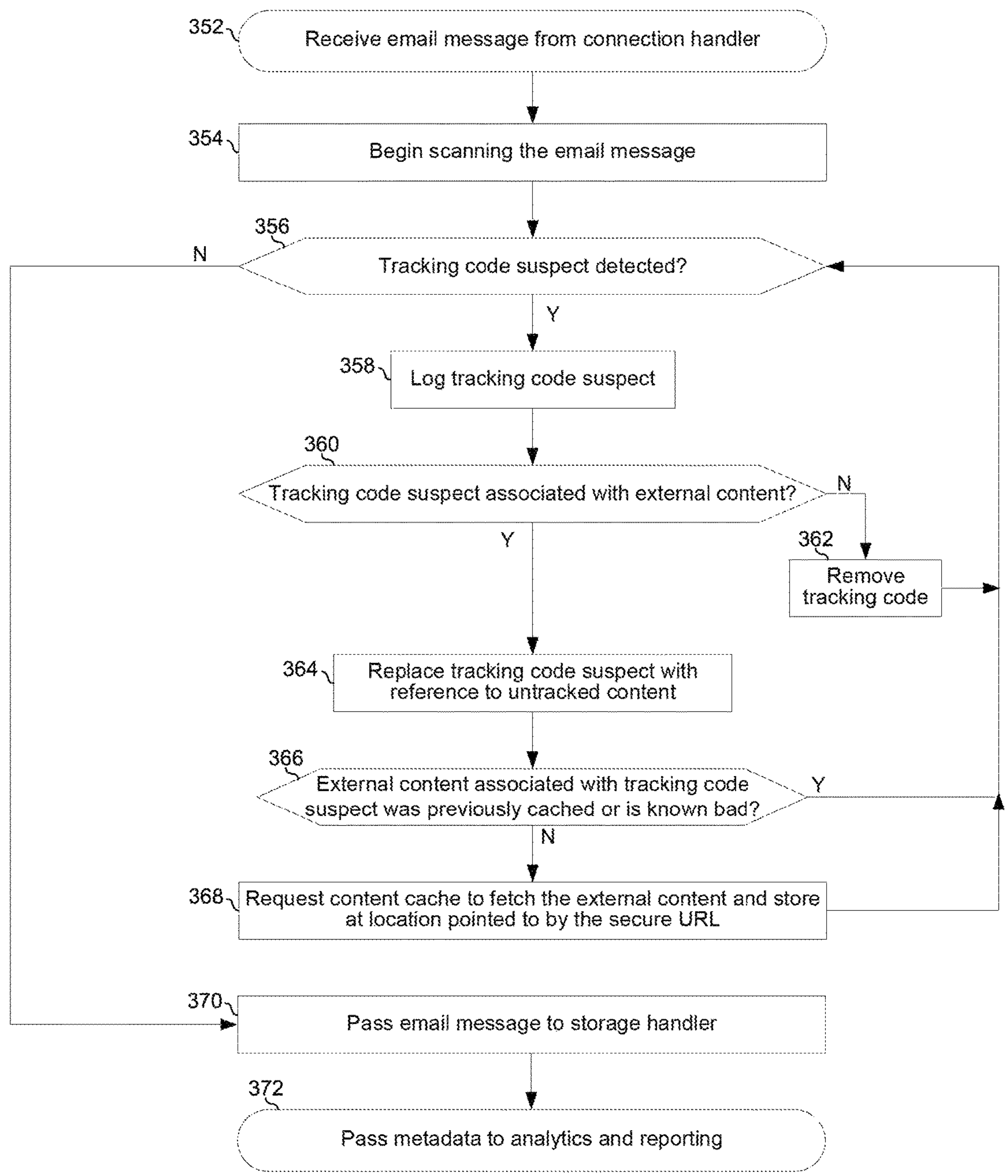
FIG. 3C is a flowchart illustrating an example process performed by the privacy enforcement circuitry of FIG. 1.

FIG. 3C is substantially similar to FIG. 3B except that all tracking code suspects (and not just confirmed tracking code) are either removed or replaced. In this manner, even if a tracking code suspect is incorrectly identified as not being tracking code, any external content associated with that tracking code suspect will nevertheless be cached by the content handling circuitry 115 before the email message becomes available in its x.com recipient(s)' mailbox(es), thus preventing the sender of the email from knowing when and where the x.com recipient(s) read and forward the email message.

Removing tracking code and/or tracking code suspects from email message 306 before the email message reaches the mailbox(es) of its intended x.com recipient(s) (the x.com RCPT TO recipient(s) as set by the sender's MUA), as done in the processes of FIGS. 3B and 3C, ensures that the recipient(s) privacy will be protected regardless of the email client(s) 120 or web client(s) 128 from which the recipient(s) check their email—all without the recipient(s) having to install or configure anything on their email client(s) 120 or web client(s) 128.

Figure 4A:
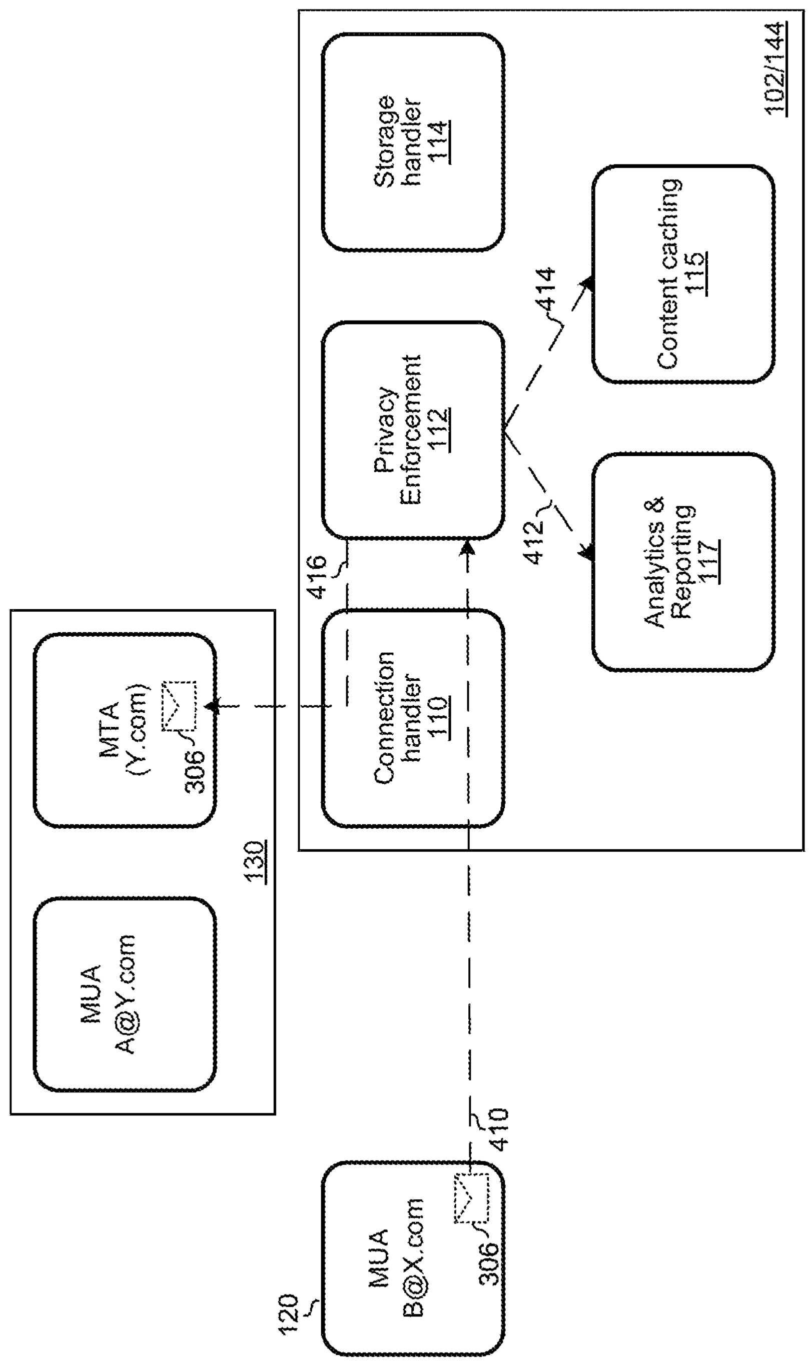
FIG. 4A illustrates a first example flow of an email message through the system of FIG. 1 during transmission of the email message by the email system of FIG. 1.

FIG. 4A illustrates a first example flow of an email message through the system of FIG. 1 during transmission of the email message by the email system of FIG. 1. Arrow 410 represents propagation of an email message 306 from B@X.com to A@Y.com that is (1) generated in a mail user agent (MUA) 120; (2) communicated to email system 102/144 (e.g., via a SMTP connection to connection handler circuitry 110); (3) processed via privacy enforcement circuitry 112; and (4) relayed to an MTA of email system 130 (Y.com's MTA). Arrow 412 illustrates data and/or metadata being passed to analytics and reporting circuitry 117. Arrow 414 illustrates data and/or metadata being passed to content handling circuitry 115.

Figure 4B:
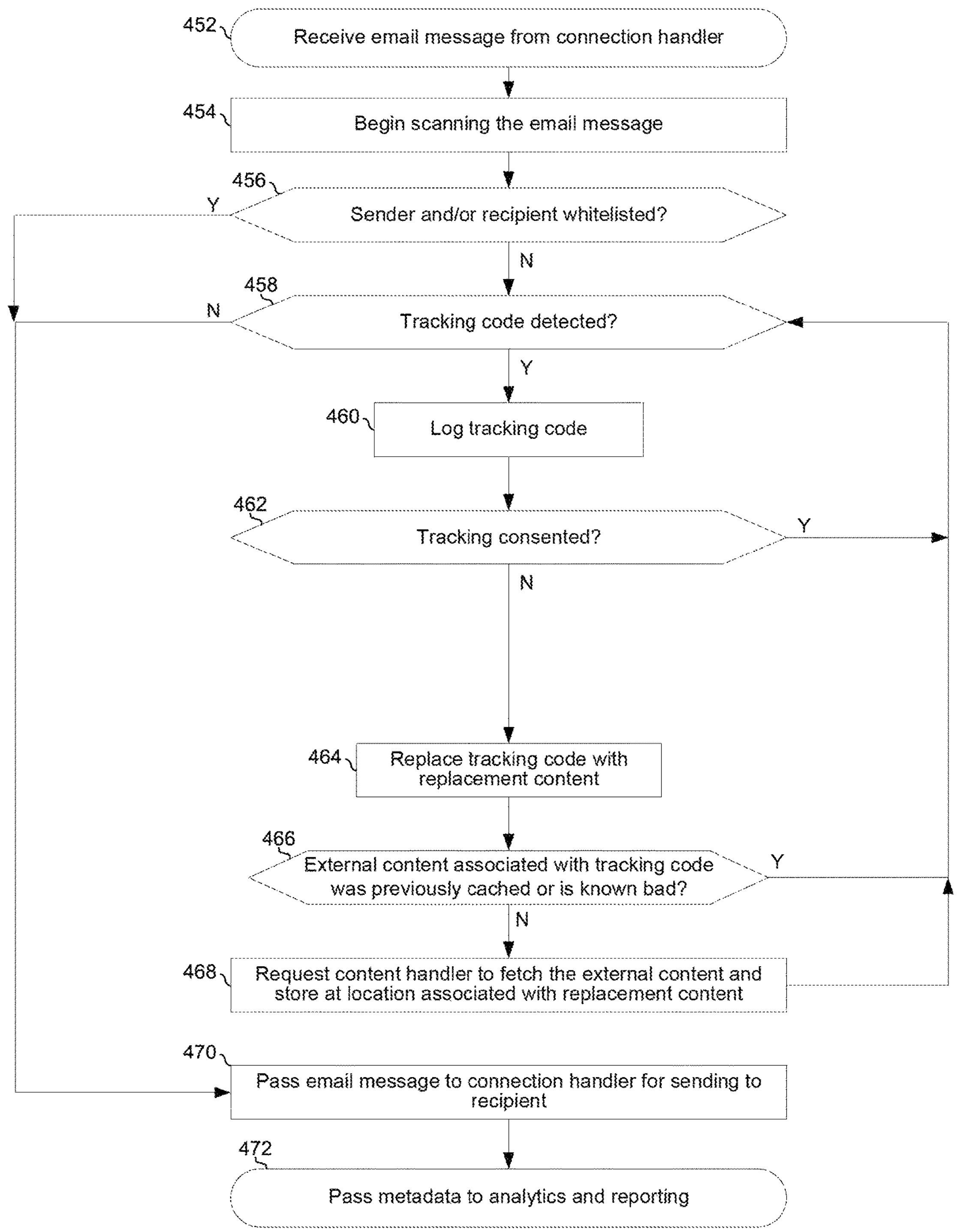
FIG. 4B is a flowchart illustrating an example process performed by the privacy enforcement circuitry of FIG. 1.

FIG. 4B is a flowchart illustrating an example process performed by the privacy enforcement circuitry of FIG. 1. The process is described with reference to elements shown in FIGS. 2 and 4A. Where the message 306 comprises multiple recipients, the process may be performed separately for each of the recipients and the message 306 may be split into multiple messages (as described in U.S. patent application Ser. No. 14/992,194, which is hereby incorporated herein by reference).

The process begins with block 452 which takes place after the email message 306 has been received by connection handler circuitry 110 via SMTP and has been passed to privacy enforcement circuitry 112, but before the email message 306 has been sent into network 124 destined for its y.com recipient(s).

In block 454, the privacy enforcement circuitry 112 begins scanning the email message 306.

In block 456, the privacy enforcement circuitry 112 determines whether the sender of the email message, the recipient of the email message, or the combination of sender and recipient of the email message has previously been whitelisted (e.g., via the interface described below with reference to FIG. 9). If the sender, recipient, or combination of sender and recipient has been whitelisted, the process advances to 470. If the sender, recipient, or combination of sender and recipient has not been whitelisted, the process advances to block 458.

In block 458, each time tracking code is detected during the scan of the email message then the process advances to block 460.

In block 460, the identified tracking code is logged. This may comprise, for example, passing the tracking code and/or characteristics of the tracking code to analytics and reporting circuitry 117 where it is added to a database. In an example implementation, the privacy enforcement circuitry 112 may flag the email message 306 as having been tracked by the sender (e.g., add the text "tracked" to the subject line and/or message body).

In block 462, the privacy enforcement circuitry 112 determines whether there is sufficient consent in the database 150 to permit sending a tracked email message to that recipient (e.g., determine whether the recipient opted in via a particular web form). If the requisite consent has been obtained (in order to comply with whatever regulations and/or policies it is desired to comply with), the process returns to block 458. If the requisite consent has not been obtained, then the process advances to block 464.

In block 464, the message modification circuitry 210 replaces the tracking code detected in block 458 with replacement content (e.g., replacement text, replacement HTML element, replacement URL, and/or the like). For example, the tracking code may comprise an <img> element with a first URL, and the message modification circuitry 210 may replace the first URL with a second URL. The second URL may point to a copy of the external content which has been cached by content handling circuitry 115.

For example, referring briefly to FIG. 5, called out as 510 is email message 306 upon arriving at the privacy enforcement circuitry 112. Called out as 520 is the email message 306 after processing by the privacy enforcement circuitry 112. The email message 306 comprises SMTP envelope 502, message headers 504, and message body 506. The message body 506 comprises an <img> element having an original URL of "URL/to/image" and an <a> element having an original URL of "URL/to/anchor." After processing by the privacy enforcement circuitry 112, the original URL of the <img> element has been replaced with replacement URL "secure/URL/1." The replacement URL may point to a cached copy of the image which targeted by the original URL. Similarly, after processing by the privacy enforcement circuitry 112, the original URL of the <a> element has been replaced with replacement URL "secure/URL/2." The replacement URL may point to the ultimate destination (after any redirects, etc.) targeted by the original URL.

In an example implementation, a replacement URL inserted by message modification circuitry 210 comprises the original URL appended to or concatenated with a URL that points to (i.e., targets) a location under common control with the email system 102/144. The original URL may be appended as a query string, as one or more path element (path elements are separated by forward slashes), or as a combination of a path element(s) and query string.

In an example implementation, a replacement URL inserted by message modification circuitry 210 is a content-ID URL that targets an image file attached to the email. For example, the <img> tag of the email may change from <img src=http://www.y.com/image12345/> to <img src=cid:image12345/>.

Returning to FIG. 4B, in block 466, it is determined whether content associated with the tracking code is already cached in the content handling circuitry 115 or is known to be unwanted or unneeded. Whether content is unwanted or unneeded may be determined based on one or more factors such as, for example: its transparency, its size (in pixels or bytes), its ALT text, whether the file name is on a black list, whether the URL at which the content is hosted (or any portion of the URL, such as domain) is on a black list, aliases or IP addresses associated with the URL at which the content is hosted, and/or the like. If the content is unwanted or unneeded, the process returns to block 458 and the scanning continues looking for more tracking code in the email message. If the content is not already cached and is not known to be unwanted or unneeded, then the process advances to block 468.

In block 468, the privacy enforcement circuitry 112 issues a request to the content handling circuitry 115 for the content handling circuitry 115 to download the external content and cache it. The privacy enforcement circuitry 112 may provide a first URL from which to retrieve the external content, and a second URL at which the cached content is to be accessible. After block 468, the process returns to block 458 and the scanning continues looking for more tracking code in the email message. In an example implementation in which the content handling circuitry 115 is in remote email subsystem 144, and the privacy enforcement circuitry 112 is in local email subsystem 102, the content cache interface circuitry 206 may queue up a plurality of URLs corresponding to content to be cached. The plurality of queued URLs may then be sent to the content handling circuitry 115 in a single request.

Returning to block 458, if no more tracking code is detected in the email message, then the process advances to block 470.

In block 470, the message, after having all tracking code removed or replaced, is passed to connection handler circuitry 110 for delivery to the recipient('s)' MTA(s) 130.

In block 472, data and/or metadata is passed to the analytics and reporting circuitry 117. Such data may include, for example, headers of the email message 306 and content and/or characteristics of tracking code detected in the email message 306 (e.g., URLs and/or HTML elements of the tracking code).

Removing tracking code and/or tracking code suspects from email message 306 before email message 306 leaves x.com's environment (i.e., before it is relayed to any third-party devices), as done in FIG. 4B, ensures that the owner of x.com will not collect data from email recipients that have not given the required consent.

Figure 4C:
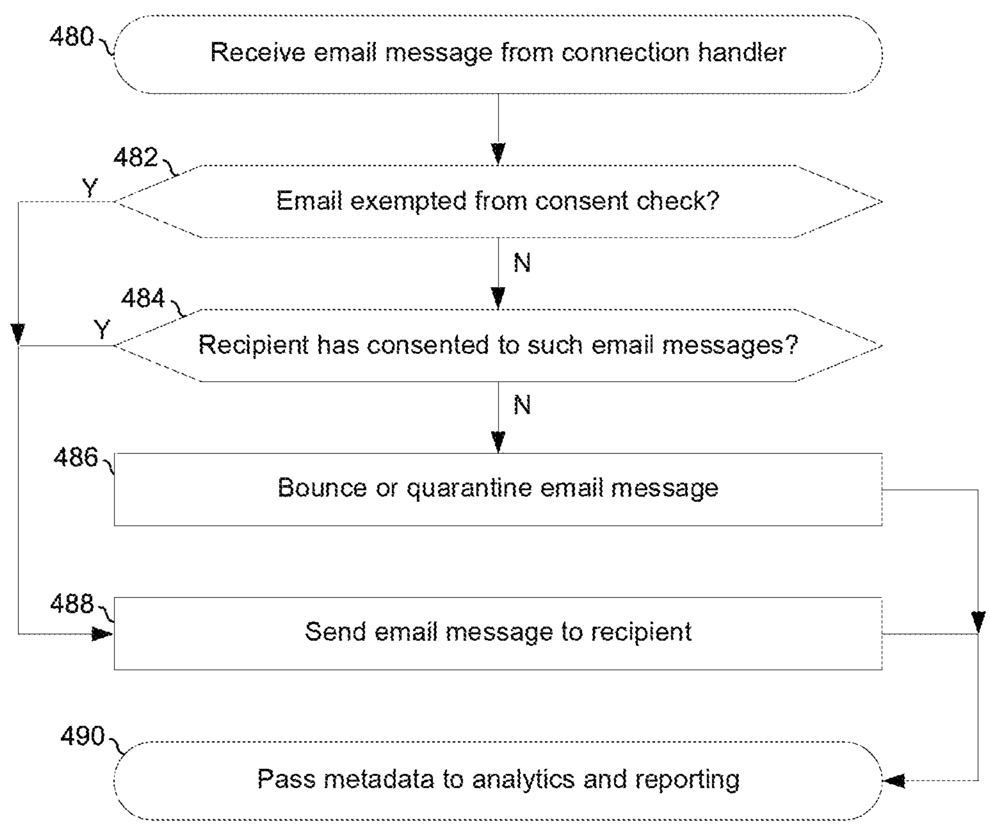
FIG. 4C is a flowchart illustrating an example process performed by the privacy enforcement circuitry of FIG. 1.

FIG. 4C is a flowchart illustrating an example process performed by the privacy enforcement circuitry of FIG. 1.

The process begins with block 480 which takes place after the email message 306 has been received by connection handler circuitry 110 via SMTP and has been passed to privacy enforcement circuitry 112, but before the email message 306 has been sent into network 124 destined for its y.com recipient(s).

In block 482, the privacy enforcement circuitry 112 determines whether the email message 306 is exempted from a "opt-in required" policy which prohibits email messages from being sent to recipients who have not opted-in to receive such email messages. For example, email messages from sales and marketing personnel may be subject to the policy whereas email messages from customer support personnel may be exempted. As another example, emails with particular message headers or particular words in the subject field may be exempt from the opt-in required policy. If the email message 306 is exempt, then the process advances to block 488. Otherwise the process advances to bloc 484.

In block 484, the privacy enforcement circuitry 112 checks the database 150 to determine if the recipient of message 306 has opted in (or, alternatively, not opted-out) to receive the message 306. If not, the process advances to block 486. Otherwise the process advances to block 488.

In block 486, the email message 306 is not delivered to the recipient. In an example implementation, block 486 comprises bouncing the message 306 back to the sender. In an example implementation, block 486 comprises quarantining the message 306 (e.g., holding in storage 108 and notifying a manager who can decide to release or bounce the message 306). After block 486, the process advances to block 490.

In block 488, the email message is sent to its recipient. After block 488, the process advances to block 490.

In block 490, data and/or metadata is passed to the analytics and reporting circuitry 117. Such data may include, for example, headers of the email message 306 and whether it was delivered, bounced, exempted from the opt-in required policy (and on what basis it was exempted), or quarantined.

Where the message 306 comprises multiple recipients, the blocks 482 through 488 may be performed separately for each of the recipients and the message 306 may be split into multiple messages (as described in U.S. patent application Ser. No. 14/992,194, which is hereby incorporated herein by reference).

Figure 6:
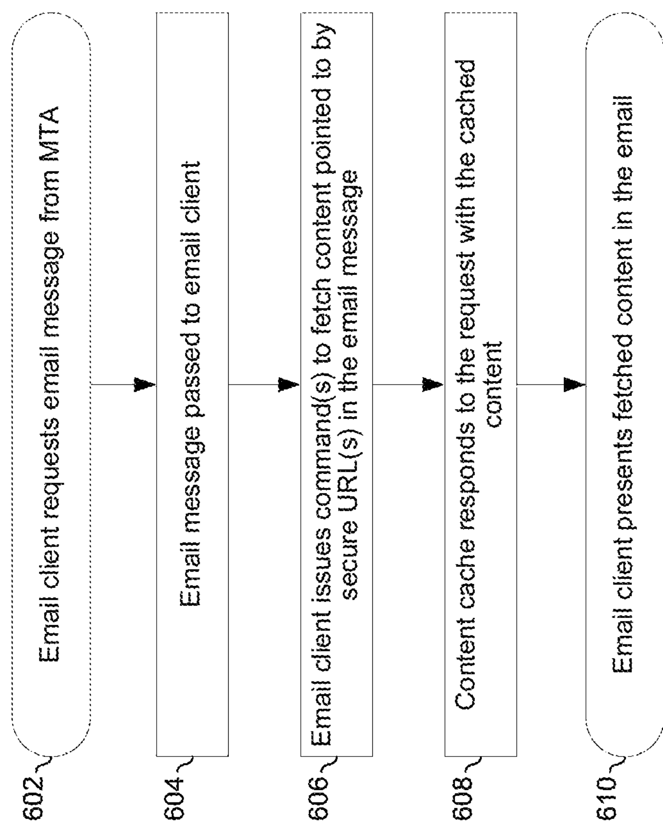
FIGS. 6 and 7 illustrate retrieval of an email by an email client in accordance with an example implementation.
Figure 7:
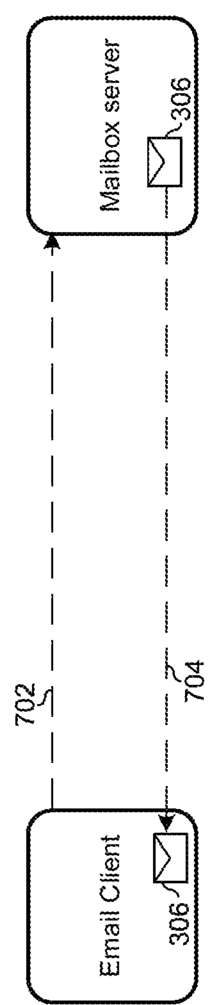

FIGS. 6 and 7 illustrate retrieval of an email by an email client in accordance with an example implementation of this disclosure. The process in FIG. 6 begins with block 602 in which an email client of an email system 130 requests the email message 306 (which was processed by privacy enforcement circuitry 112 per FIG. 4B) from an MTA of email system 130.

In block 604, the requested email message is passed from the MTA of email system 130 to the email client of system 130.

In block 606, the email client of email system 130 issues a command (e.g., an HTTP GET command) to fetch the image pointed to by the replacement URL (hosted by content handling circuitry 115).

In block 608, the content handling circuitry 115 receives the request from the email client, retrieves the image from storage 108, and sends the content to the email client (e.g., in an HTTP response).

In block 610, the email client receives the image and presents it in the body of the email message 306. Because content handling circuitry 115 (and not email client 120) retrieved the image from the original URL, and because any subsequent requests for the image (whether by the same email client 120 or a different email client 120) will be served by content handling circuitry 115, the host of the original URL (and thus the sender of the email message 306) does not see: the type of device on which email client 120 is running, the location of the email client 120, the time that the email client 120 read the email message 356, or how many times email client 120 opened the email message 306. In an example implementation, where appropriate consent has been received, the content handling circuitry 115 may report that the email has been opened to the analytics and reporting circuitry 117, and may do so only the first time the email is opened. In this manner, the privacy enforcement circuitry 112 allows the email sender to obtain the limited, consented-to information of whether or not the email has been opened but prevents the collection of sensitive, not-consented-to information such as the I.P. address and device/browser from which the email was opened. Furthermore, the limited, consented-to information is held only by x.com such that x.com can implement the proper controls over it and delete it at the request of the email recipient.

In some instances, the content handling circuitry 115 may not yet have had a chance to retrieve and cache the image. In such instances, the content handling circuitry 115 may retrieve the image from the location pointed to by the original URL (which may be included in the HTTP GET command as, for example, a query string of the requested URL), cache the content at a location pointed to by the replacement URL, then send the response with the image to the email client 120.

In FIG. 7, arrow 702 represents the request sent from the client of email system 130 to the mailbox server of email system 130. Arrow 704 represents the email message 306 being conveyed from the mailbox server to the email client.

Figure 8:
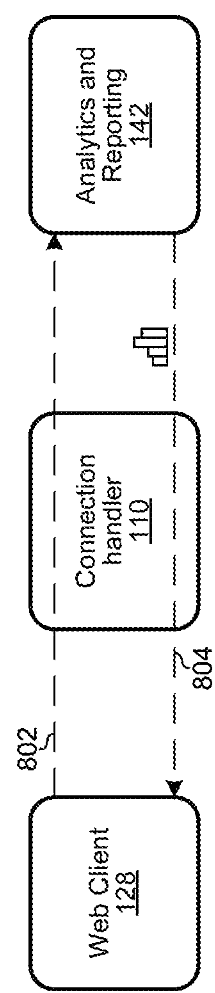
FIG. 8 illustrates the email system of FIG. 1 serving an analytics dashboard to a web client.

FIG. 8 illustrates the email system of FIG. 1 serving an analytics dashboard to a web client. The web client 128 issues a request (e.g., a HTTP POST request) 802 which is received (via connection handler circuitry 110) by analytics and reporting circuitry 142. The analytics and reporting circuitry 142 responds with content (HTML, javascript, CSS, etc.) that, when rendered in the web client 128, results in a dashboard such as the one described below with reference to FIG. 9.

FIG. 9 illustrates an example dashboard of the email system of FIG. 1. Shown is a web client 128 displaying a browser window 904 in which is rendered a dashboard comprising interface elements that provide information about processing that has been completed by the email system 102/144 and interface elements via which a user can configure behavior of the email system 102/144. In the example shown, the interface elements are arranged into a table in which each row corresponds to an email message in which privacy enforcement circuitry 112 detected tracking code, and each column is as described below.

The cell in each row of column 906 holds the receipt date of the email message corresponding to the row. The email system 102/144 may have extracted the receipt date from the SMTP envelope and/or headers of the email message.

The cell in each row of column 908 holds the sender of the email message corresponding to the row. The email system 102/144 may have extracted the sender information from the SMTP envelope and/or headers of the email message.

The cell in each row of column 910 holds the subject line of the email message corresponding to the row. The email system 102/144 may have extracted the subject line from the headers of the email message.

In other embodiments, other columns similar to 906, 908, and 910 may be present and may hold other information extracted from the SMTP envelope, email message headers, email message body, and/or email message attachments.

The cell in each row of column 912 contains an interface element (e.g., a checkbox) that enables a user of the dashboard to add the sender of the email message to a whitelist. For example, checking the box in column 912 and row 918 may prevent the privacy enforcement circuitry 112 from removing or replacing tracking code in future emails from F@Z.com. In another example implementation, the dashboard may provide interface elements for whitelisting by domain (e.g., not replacing or removing tracking code from any sender with an @Z.com email address).

In another example implementation, the dashboard may comprise another or different table in which each row corresponds to an instance of identified tracking code. Such a table may show allow whitelisting or blacklisting particular tracking code or class/group of tracking code (e.g., whitelisting or blacklisting by domain, subdomain, and/or path elements).

The cell in each row of column 916 indicates a characterization of the corresponding email message. In the example shown, the characterization is a categorization of tracking code detected in the email message, where the categories are: individually targeted tracking code, behavioral marketing tracking code, and bulk marketing tracking code. This characterization may be determined based on, for example, the features provided by the tool which generated the tracking code (e.g., whether the tool provides information on location of the recipient at the time of open). In another example implementation, the characterization may be a risk level of the email message determined based on, for example, the sender (or just the sender's domain), the category of tracking code, and/or content of the message headers and/or body.

Figure 10:
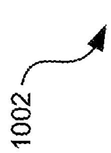
FIG. 10 illustrates an example implementation of the database 150 of FIG. 1.

FIG. 10 illustrates an example implementation of the database 150 of FIG. 1. Each row in the table 1002 corresponds to an email address. For any particular row, column 1006 stores the date that the email address opted in to receive emails and columns 1008, 1010, and 1012 indicates the specifics of what precisely was opted into. In this example, the version of the privacy policy accepted in stored in column 1008, whether or not the collection of IP address was consented to is stored in column 1010, and whether or not collection of email open history was consented to is stored in column 1012. In another example implementation, the database 150 may store opted-out status instead of, or in addition to, opted-in status.

In accordance with an example implementation of this disclosure, a system comprises connection handler circuitry (e.g., 110) of a first email subsystem (e.g., 102/144) and privacy enforcement circuitry (e.g., 112) of the first email subsystem. The connection handler circuitry is operable to receive the email message from a mail user agent (e.g., 120). The privacy enforcement circuitry is operable to, after the reception of the email message by the connection handler circuitry and before relaying of the email message to a second email subsystem (e.g., 130): detect tracking code in the email message; replace the detected tracking code with replacement content. The connection handler circuitry is operable to send the email message to the second email subsystem after the replacement of the detected tracking code in the email message. The tracking code may comprise a first uniform resource locator (URL), and the replacement content may comprise a second URL. The system may comprise content cache interface circuitry (e.g., 206) of the first email subsystem, wherein the content cache interface circuitry is operable to send the first URL and second URL to content caching circuitry. The second URL may comprise the first URL as a query string. The second URL may comprise the first URL as one or more path elements. The system may comprise the content caching circuitry (e.g., 115 and 108) of the first email subsystem, wherein the content caching circuitry is operable to fetch content from the first URL and store the content at a location pointed to by the second URL. The system may comprise the content caching circuitry (e.g., 115 and 108) of the first email subsystem, wherein the content caching circuitry is operable to: determine whether content stored at the first URL is wanted or needed; fetch needed or wanted content from the first URL and store the fetched content at a location targeted by the second URL; and not fetch unwanted an unneeded content from the first URL. The system may comprise the content caching circuitry (e.g., 115 and 108) of the first email subsystem, wherein the content caching circuitry is operable to: determine whether content stored at the first URL is wanted or needed; if the content stored at the first URL is wanted or needed, fetch the content from the first URL and store the fetched content at a location targeted by the second URL; and if the content stored at the first URL is not wanted and not needed, store previously-stored content at the location targeted by the second URL. The system may comprise content the caching circuitry (e.g., 115 and 108) of the first email subsystem, wherein the content caching circuitry is operable to: fetch content from the first URL and store the fetched content at a location targeted by the second URL; and in response to requests from mail user agents in which the email message is opened, serve the stored content without any additional fetches of the content from the first URL. The privacy enforcement circuitry may be operable to detect the tracking code based on: a transparency attribute of an image associated with the first URL, a size attribute of an image associated with the first URL, a domain or Internet Protocol (IP) address corresponding to the first URL, length, in number of alphanumeric characters, of the first URL, and/or characteristics of visible content of an image associated with the first URL. The system may comprise tracking code analyzer circuitry (e.g., 202), wherein the tracking code analyzer circuitry is operable to: determine which one of a plurality of categories to assign to identified tracking code based on a domain or IP address associated with the identified tracking code; and assign the one of the plurality of categories to the identified tracking code based on the level of personal information disclosed by the tracking tool associated with the identified tracking code. The system may comprise reporting circuitry (e.g., 117) wherein the reporting circuitry is operable to generate a report that presents the assigned one of the plurality of the categories for the identified tracking code. The system may comprise user interface circuitry (e.g., 117), wherein the user interface circuitry is operable to generate a user interface via which a user can whitelist a sender of the email message such that the privacy enforcement circuitry will not remove tracking code in future email messages from the sender. The system may comprise user interface circuitry, wherein the user interface circuitry is operable to generate a user interface via which a user can whitelist a recipient of the email message such that the privacy enforcement circuitry will not remove tracking code in future email messages to the recipient. The system may comprise storage circuitry (e.g., 108) in which resides a consent tracking database (e.g., 150). The consent tracking database may comprise one or more fields that indicate email addresses of users who have opted in to receive tracking code in email messages and/or one or more fields that indicate email addresses of users who have opted out of receiving tracking code in email messages.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. The machine-readable medium may be accessible via a network (e.g., the Internet) such that when the code is downloaded and installed on local machines, the local machines are configured into a system as described in this disclosure, and when the code is executed by such system, the system performs processes described in this disclosure.

While the present method and/or system has been described with reference to certain implementations, it will be understood by those skilled in the art that various changes may be made and equivalents may be substituted without departing from the scope of the present method and/or system. In addition, many modifications (e.g., re-ordering of flowchart blocks) may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:

connection handler circuitry of a first email subsystem, content caching circuitry of the first email subsystem, and privacy enforcement circuitry of the first email subsystem, wherein:

the connection handler circuitry is configured to receive an email message from a mail user agent;

the privacy enforcement circuitry is configured to, after the reception of the email message by the connection handler circuitry and before relaying of the email message to a second email subsystem:

detect tracking code in the email message;

assign one of a plurality of categories to the detected tracking code based on characteristics of the detected tracking code; and replace the detected tracking code with replacement content;

the connection handler circuitry is configured to send the email message to the second email subsystem after the replacement of the detected tracking code in the email message;

the tracking code comprises a first uniform resource locator (URL);

the replacement content comprises a second URL; and the content caching circuitry is configured to:

determine whether content stored at the first URL is wanted or needed;

if the content stored at the first URL is wanted or needed, fetch the content from the first URL and store the fetched content at a location targeted by the second URL; and not fetch the content from the first URL if the content stored at the first URL is not wanted and not needed.

2. The system of claim 1, comprising content cache interface circuitry of the first email subsystem, wherein the content cache interface circuitry is configured to send the first URL and second URL to the content caching circuitry.

3. The system of claim 1, wherein the second URL comprises the first URL as one of: a query string, one or more path elements, a combination of a query string and one or more path elements.

4. The system of claim 1, wherein the privacy enforcement circuitry is configured to detect the tracking code based on a transparency attribute and/or size attribute of an image associated with the first URL.

5. The system of claim 1, wherein the privacy enforcement circuitry is configured to detect the tracking code based a domain or Internet Protocol (IP) address corresponding to the first URL.

6. The system of claim 1, wherein the privacy enforcement circuitry is configured to detect the tracking code based on a length, in number of alphanumeric characters, of the first URL.

7. The system of claim 1, wherein the privacy enforcement circuitry is configured to detect the tracking code based on characteristics of visible content of an image associated with the first URL.

8. The system of claim 1, wherein the privacy enforcement circuitry is configured to:

assign the one of the plurality of categories to the detected tracking code based on a tracking tool associated with the tracking code.

9. The system of claim 8, comprising reporting circuitry, wherein the reporting circuitry is configured to generate a report that presents the assigned one of the plurality of the categories for the detected tracking code.

10. The system of claim 1, comprising user interface circuitry, wherein the user interface circuitry is configured to generate an interface via which a user can whitelist a sender of the email message such that the privacy enforcement circuitry will not remove tracking code in future email messages from the sender.

11. The system of claim 1, comprising user interface circuitry, wherein the user interface circuitry is configured to generate an interface via which a user can whitelist a recipient of the email message such that the privacy enforcement circuitry will not remove tracking code in future email messages to the recipient.

12. The system of claim 1, comprising storage circuitry in which resides a consent tracking database.

13. The system of claim 12, wherein the consent tracking database comprises one or more fields that indicate email addresses of users who have opted in to receive tracking code in email messages.

14. The system of claim 1, wherein the consent tracking database comprises one or more fields that indicate email addresses of users who have opted out of receiving tracking code in email messages.

15. A system comprising:

connection handler circuitry of a first email subsystem, content caching circuitry of the first email subsystem, and privacy enforcement circuitry of the first email subsystem, wherein:

the connection handler circuitry is configured to receive an email message from a mail user agent;

the privacy enforcement circuitry is configured to, after the reception of the email message by the connection handler circuitry and before relaying of the email message to a second email subsystem:

detect tracking code in the email message; and replace the detected tracking code with replacement content;

the connection handler circuitry is configured to send the email message to the second email subsystem after the replacement of the detected tracking code in the email message;

the tracking code comprises a first uniform resource locator (URL);

the replacement content comprises a second URL;

assign one of a plurality of categories to the detected tracking code based on characteristics of the detected tracking code; and the content caching circuitry is configured to:

determine whether content stored at the first URL is wanted or needed;

if the content stored at the first URL is wanted or needed, fetch the content from the first URL and store the fetched content at a location targeted by the second URL; and if the content stored at the first URL is not wanted and not needed, store previously-stored content at the location targeted by the second URL.

16. The system of claim 15, comprising content cache interface circuitry of the first email subsystem, wherein the content cache interface circuitry is configured to send the first URL and second URL to the content caching circuitry.

17. The system of claim 15, wherein the second URL comprises the first URL as one of: a query string, one or more path elements, a combination of a query string and one or more path elements.

18. The system of claim 15, wherein the privacy enforcement circuitry is configured to detect the tracking code based on a transparency attribute and/or size attribute of an image associated with the first URL.

19. The system of claim 15, wherein the privacy enforcement circuitry is configured to detect the tracking code based a domain or Internet Protocol (IP) address corresponding to the first URL.

20. The system of claim 15, wherein the privacy enforcement circuitry is configured to detect the tracking code based on a length, in number of alphanumeric characters, of the first URL.

21. The system of claim 15, wherein the privacy enforcement circuitry is configured to detect the tracking code based on characteristics of visible content of an image associated with the first URL.

22. The system of claim 15, wherein the privacy enforcement circuitry is configured to assign the one of the plurality of categories to the detected tracking code based on a tracking tool associated with the detected tracking code.

23. The system of claim 22, comprising reporting circuitry, wherein the reporting circuitry is configured to generate a report that presents the assigned one of the plurality of the categories for the detected tracking code.

24. The system of claim 15, comprising user interface circuitry, wherein the user interface circuitry is configured to generate an interface via which a user can whitelist a sender of the email message such that the privacy enforcement circuitry will not remove tracking code in future email messages from the sender.

25. The system of claim 15, comprising user interface circuitry, wherein the user interface circuitry is configured to generate an interface via which a user can whitelist a recipient of the email message such that the privacy enforcement circuitry will not remove tracking code in future email messages to the recipient.

26. The system of claim 15, comprising storage circuitry in which resides a consent tracking database.

27. The system of claim 26, wherein the consent tracking database comprises one or more fields that indicate email addresses of users who have opted in to receive tracking code in email messages.

28. The system of claim 15, wherein the consent tracking database comprises one or more fields that indicate email addresses of users who have opted out of receiving tracking code in email messages.

29. A system comprising:

connection handler circuitry of a first email subsystem, content caching circuitry of the first email subsystem, and privacy enforcement circuitry of the first email subsystem, wherein:

the connection handler circuitry is configured to receive an email message from a mail user agent;

the privacy enforcement circuitry is configured to, after the reception of the email message by the connection handler circuitry and before relaying of the email message to a second email subsystem:

detect tracking code in the email message;

assign one of a plurality of categories to the detected tracking code based on characteristics of the detected tracking code; and replace the detected tracking code with replacement content;

the connection handler circuitry is configured to send the email message to the second email subsystem after the replacement of the detected tracking code in the email message;

the tracking code comprises a first uniform resource locator (URL);

the replacement content comprises a second URL; and the content caching circuitry is configured to:

fetch content from the first URL and store the fetched content at a location targeted by the second URL; and in response to requests from mail user agents in which the email message is opened, serve the stored content without any additional fetches of the content from the first URL.

30. The system of claim 29, comprising content cache interface circuitry of the first email subsystem, wherein the content cache interface circuitry is configured to send the first URL and second URL to the content caching circuitry.

31. The system of claim 29, wherein the second URL comprises the first URL as one of: a query string, one or more path elements, a combination of a query string and one or more path elements.

32. The system of claim 29, wherein the privacy enforcement circuitry is configured to detect the tracking code based on a transparency attribute and/or size attribute of an image associated with the first URL.

33. The system of claim 29, wherein the privacy enforcement circuitry is configured to detect the tracking code based a domain or Internet Protocol (IP) address corresponding to the first URL.

34. The system of claim 29, wherein the privacy enforcement circuitry is configured to detect the tracking code based on a length, in number of alphanumeric characters, of the first URL.

35. The system of claim 29, wherein the privacy enforcement circuitry is configured to detect the tracking code based on characteristics of visible content of an image associated with the first URL.

36. The system of claim 29, wherein the privacy enforcement circuitry is configured to assign the one of the plurality of categories to the detected tracking code based on a tracking tool associated with the detected tracking code.

37. The system of claim 36, comprising reporting circuitry, wherein the reporting circuitry is configured to generate a report that presents the assigned one of the plurality of the categories for the detected tracking code.

38. The system of claim 29, comprising user interface circuitry, wherein the user interface circuitry is configured to generate an interface via which a user can whitelist a sender of the email message such that the privacy enforcement circuitry will not remove tracking code in future email messages from the sender.

39. The system of claim 29, comprising user interface circuitry, wherein the user interface circuitry is configured to generate an interface via which a user can whitelist a recipient of the email message such that the privacy enforcement circuitry will not remove tracking code in future email messages to the recipient.

40. The system of claim 29, comprising storage circuitry in which resides a consent tracking database.

41. The system of claim 40, wherein the consent tracking database comprises one or more fields that indicate email addresses of users who have opted in to receive tracking code in email messages.

42. The system of claim 29, wherein the consent tracking database comprises one or more fields that indicate email addresses of users who have opted out of receiving tracking code in email messages.

* * * * *